(12) United States Patent
Cantwell et al.

(10) Patent No.: US 10,242,472 B2
(45) Date of Patent: *Mar. 26, 2019

(54) TREND DYNAMIC SENSOR IMAGING USING CONTOUR MAPS TO VISUALIZE MULTIPLE TREND DATA SETS IN A SINGLE VIEW

(71) Applicant: Applied Materials, Inc., Santa Clara, CA (US)

(72) Inventors: Dermot Cantwell, Sunnyvale, CA (US); Serguei Platonov, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,892

(22) Filed: Jan. 29, 2018

(65) Prior Publication Data

US 2018/0211426 A1 Jul. 26, 2018

Related U.S. Application Data

(63) Continuation of application No. 14/070,156, filed on Nov. 1, 2013, now Pat. No. 9,881,398.

(Continued)

(51) Int. Cl.
*G06T 11/20* (2006.01)
*G06F 3/0481* (2013.01)

(52) U.S. Cl.
CPC .......... *G06T 11/206* (2013.01); *G06F 3/0481* (2013.01); *G06T 11/20* (2013.01); *G05B 2219/31447* (2013.01)

(58) Field of Classification Search
CPC ...... G06T 11/206; G06T 11/20; G06F 3/0481; G05B 2219/31447
See application file for complete search history.

(56) References Cited

U.S. PATENT DOCUMENTS

| 6,421,620 | B1 | 7/2002 | Kotlow |
| 6,734,958 | B1* | 5/2004 | MacKinnon ........... G01M 11/00 250/228 |

(Continued)

FOREIGN PATENT DOCUMENTS

| TW | 2004-05184 A | 4/2004 |
| TW | 2008-17891 A | 4/2008 |

OTHER PUBLICATIONS

International Search Report and Written Opinion dated Feb. 25, 2014, on application No. PCT/US2013/068562.

*Primary Examiner* — Tapas Mazumder
(74) *Attorney, Agent, or Firm* — Lowenstein Sandler LLP

(57) ABSTRACT

A method and system for trend dynamic sensor imaging is described herein. The method includes receiving, from a plurality of sensors, a plurality of data sets, and comparing the plurality of data sets to reference data to generate, for each of the plurality of sensors, one or more corresponding comparison values. The method further includes transforming, using the one or more corresponding comparison values for each of the plurality of sensors, the plurality of data sets to have a common scale regardless of corresponding physical processes, and causing anomalies in one or more physical processes to be displayed via a client device by plotting the transformed plurality of data sets according to the common scale.

20 Claims, 16 Drawing Sheets
(12 of 16 Drawing Sheet(s) Filed in Color)

Related U.S. Application Data

(60) Provisional application No. 61/723,265, filed on Nov. 6, 2012.

(56) References Cited

U.S. PATENT DOCUMENTS

| | | | |
|---|---|---|---|
| 7,353,475 | B2 | 4/2008 | White et al. |
| 8,880,370 | B1* | 11/2014 | Kadambe ............... G01R 23/16 324/76.12 |
| 2003/0061212 | A1 | 3/2003 | Smith et al. |
| 2003/0122093 | A1 | 7/2003 | Schauer |
| 2003/0162301 | A1* | 8/2003 | Noergaard ........... A61B 5/7267 436/172 |
| 2005/0288810 | A1 | 12/2005 | Lin et al. |
| 2008/0276137 | A1* | 11/2008 | Lin ................... G05B 23/0267 714/57 |
| 2008/0317329 | A1* | 12/2008 | Shibuya ................ G06T 7/0004 382/149 |
| 2010/0260722 | A1 | 10/2010 | Ebisawa et al. |
| 2011/0225622 | A1 | 9/2011 | Pearcy et al. |
| 2011/0227915 | A1 | 9/2011 | Mandella et al. |
| 2012/0041574 | A1 | 2/2012 | Hsiung et al. |
| 2012/0143016 | A1* | 6/2012 | Wittliff .................... G06N 5/02 600/300 |
| 2012/0143516 | A1 | 6/2012 | Mezic et al. |
| 2012/0158808 | A1* | 6/2012 | Yang ...................... G01D 21/00 708/206 |
| 2012/0212505 | A1* | 8/2012 | Burroughs .......... G06F 19/3481 345/629 |
| 2013/0061188 | A1 | 3/2013 | Hou et al. |
| 2013/0278605 | A1 | 10/2013 | Pathak et al. |

\* cited by examiner

TREND DYNAMIC SENSOR IMAGING USING CONTOUR MAPS TO VISUALIZE MULTIPLE TREND DATA SETS IN A SINGLE VIEW

RELATED APPLICATION

This patent application is a continuation of U.S. patent application Ser. No. 14/070,156, filed on Nov. 1, 2013, which claims the benefit of U.S. Provisional Application No. 61/723,265, filed on Nov. 6, 2012, the entire contents of both are hereby incorporated by reference.

TECHNICAL FIELD

The present disclosure relates to data visualization, and, more particularly, to data visualization for analyzing physical processes.

BACKGROUND OF THE INVENTION

Data visualization is a technique used to transform large quantities of data into a manageable and useful form. Data visualization can be particularly useful for analyzing a physical process, such as semiconductor manufacturing, where sensors provide more data than an individual user can efficiently mentally process by simply reviewing the raw numerical data, by aiding a user to rapidly review sensor data so that decisions regarding the physical process can be made effectively.

In some applications, a user would benefit from being able to use data visualization to review data from a number of different data sources over a period of time, such that the user would be able to discern data trends over time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of example, and not by way of limitation, in the figures of the accompanying drawings.

DETAILED DESCRIPTION

Embodiments of the present invention are directed to a method and system for visualizing data obtained from a physical process using trend dynamic sensor imaging (DSI). A trend DSI system receives a data set from each of a plurality of data sources for a time frame of interest, such as sensor data from a semiconductor manufacturing system, where the data sources may provide data of different scales. The trend DSI system then pre-processes the data in the data sets such that the data has a common scale. Once the data has been pre-processed, the system displays the data sets on a grid by plotting the transformed data according to a color gradient or scale. Here, the user is able to efficiently and effectively consider large quantities of data for detection of anomalies (e.g., outliers), such as flaws in a semiconductor manufacturing process, and how changing one parameter affects other parameters. For example, a user is able to view multiple SPC trend charts in a single view, and expose and/or investigate features of interest.

Figure 1:
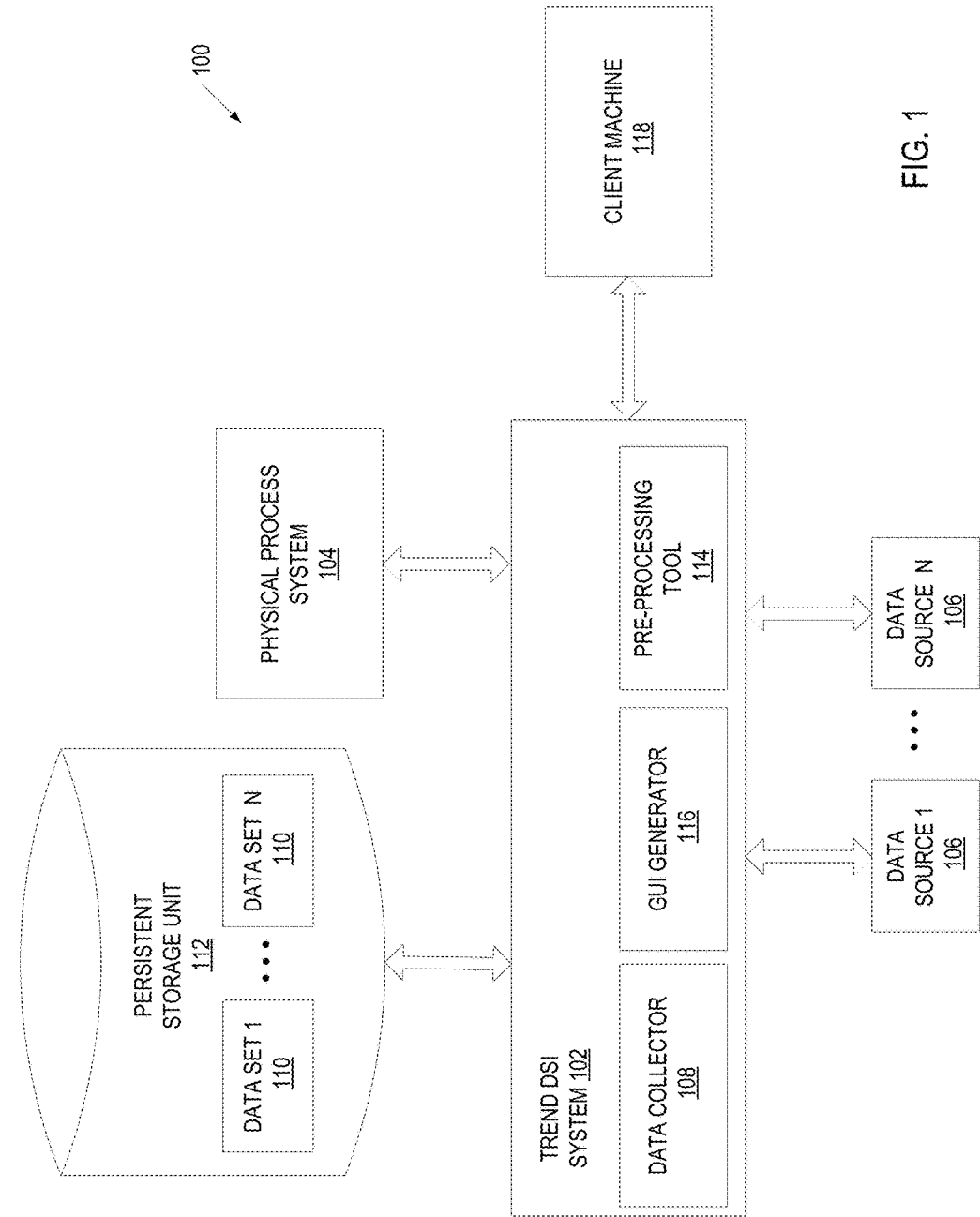
FIG. 1 illustrates an embodiment of a trend dynamic sensor imaging (DSI) system.

FIG. 1 illustrates an example network architecture 100 in which embodiments of the present disclosure can operate. In one embodiment, network architecture 100 includes a trend DSI system 102 connected to physical process system 104 and a plurality of data sources 106 (e.g., via a network such as a local area network or Internet). The system 102 can be hosted by any type of computing device including desktop computers, laptop computers, handheld computers or similar computing devices.

The physical process system 104 can include different types of physical processes from which data can be generated. For example, the physical process system 104 could include manufacturing tools. Examples of manufacturing tools include semiconductor manufacturing tools, such as etchers, chemical vapor deposition furnaces, etc, for the manufacture of electronic devices. Manufacturing such devices includes dozens of manufacturing steps involving different types of manufacturing processes, which may be known as a recipe. In another example, the physical process system 104 could include a biomedical application, where physical processes cause parameters such as temperature and resistance to vary over time. The physical process system 104 can include any type of computing device, including desktop computers, laptop computers, handheld computers or similar computing devices, to control the system.

In other embodiments, the physical process system 104 is not connected to the system 102.

The architecture 100 may also include data sources 106 that generate data about the physical process system 104 over time. For example, the data sources 106 can be sensors that detect information about the physical process system 104. In the example of a semiconductor manufacturing system, hundreds of sensors may detect data pertaining to manufacturing tools, where the data may include, for example, temperature, pressure, gas flow, and RF power, among others, over time. Data sources 112 may be part of the physical process system 104 or may be connected to the physical process system 104 (e.g., via a network).

Each data source 106 generates a data set 110 including the data from the data source 106. A data collector 108 of system 102 can collect the data sets 110 from the data sources 106 and store them in a persistent storage unit 112.

The system 102 also includes a pre-processing tool 114 for transforming data of the data sets 110 to have a common scale. Since the retrieved data sets 110 all have different scales, the data of the data sets 110 is transformed to a common scale so that the data sets 110 can be meaningfully visualized in one display. For example, one of the data sets 110 may have a larger range of values (or scale) than another of the data sets 110. Here, if a user were to visualize the raw data of these data sets 110 simply plotted on a grid, the user would not be able to appreciate relative variations of the data in all of the data sets 110. In other words, the user would not be able to perceive variations in the data set 110 with the smaller range of values (or scale) when plotted on a grid scaled to accommodate the data set 110 with the larger range of values (or scale). Therefore, the data of the data sets 110 must be transformed to have a common scale in order to be effectively perceived together on one display.

In one embodiment, the system 102 includes a graphical user interface (GUI) generator 116 that generates a GUI to display the data sets 110. In particular, the GUI generator 116 displays the data sets 110 by plotting the transformed data according to a color gradient. The GUI generator 116 can generate GUIs to illustrate data trends for a large number of data sets over time. FIGS. 4-12, described in greater detail below, illustrate exemplary GUIs for enabling a trend DSI system 102.

The GUIs generated by the GUI generator 116 can be accessible via a browser on one or more client machines 118, or, in one embodiment, the GUI generator can reside on the client machine 118 and can receive the transformed data from the pre-processing tool 114 via a network. Client machines 118 can be any type of computing device including desktop computers, laptop computers, mobile communications devices, cell phone, smart phones, handheld computers or similar computing devices.

In one embodiment, the physical process system 104, the data sources 106, the persistent storage unit 112, and the client machine 118 are connected to the trend DSI system 102, which make a direct connection or an indirect connection via a hardware interface (not shown), or via a network (not shown). The network can be a local area network (LAN), such as an intranet within a company, a wireless network, a mobile communications network, or a wide area network (WAN), such as the Internet or similar communication system. The network can include any number of networking and computing devices such as wired and wireless devices.

The division of functionality presented above is by way of example only. In other embodiments, the functionality described could be combined into a monolithic component or sub-divided into any combination of components. The data collector 108, the GUI generator 116, the client machine 118, and the pre-processing tool 114 can be hosted on a single computer system, on separate computer systems, or on a combination thereof.

Figure 2:
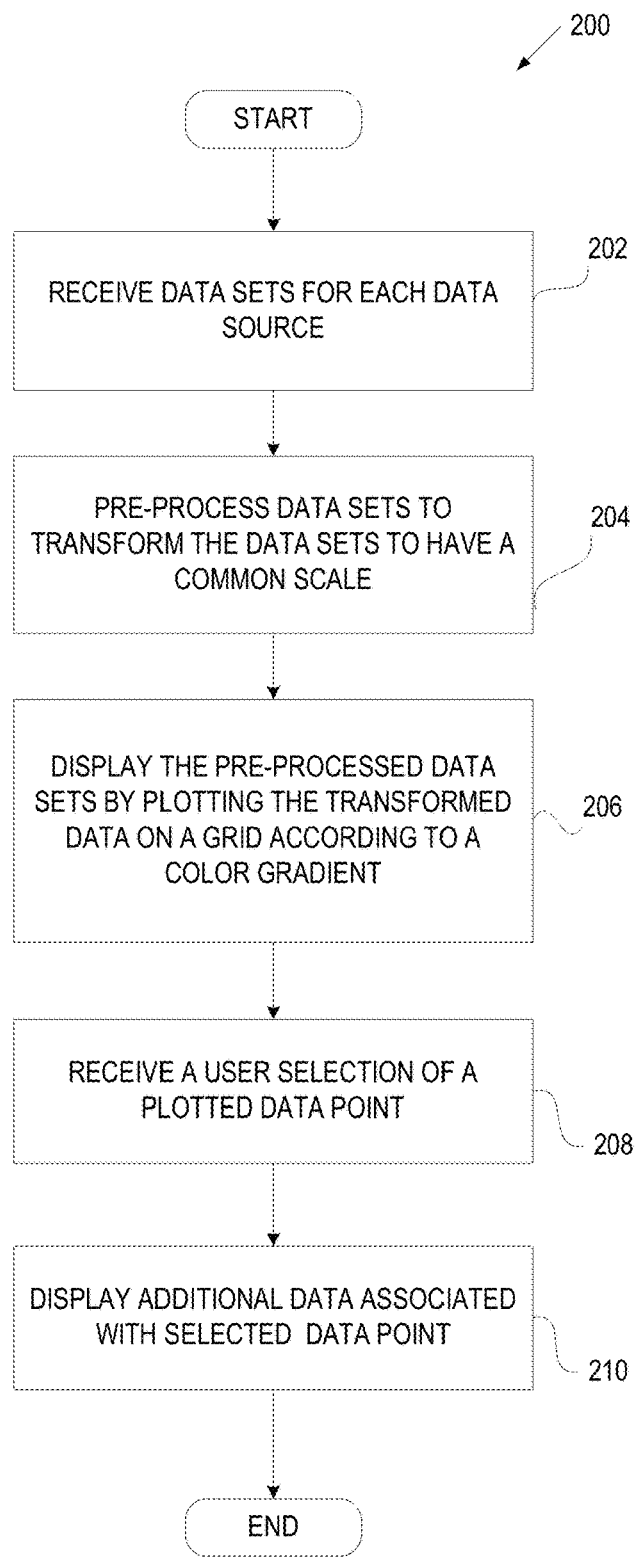
FIG. 2 illustrates one embodiment of a method for trend DSI.

FIG. 2 illustrates one embodiment of a method 200 for trend DSI. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the trend DSI system of FIG. 1.

At block 202, processing logic of the system 102 receives the data set 110 for each data source 106. The trend DSI system 102 can receive the data set 110 from the data sources 106, from the persistent storage unit 112, or via some other source.

At block 204, processing logic of the pre-processing tool 114 of the system 102 pre-processes the data sets 110 to transform the data to have a common scale.

At block 206, processing logic displays the pre-processed data sets by plotting the transformed data on a grid according to a color gradient. In an embodiment, the transformed data is displayed on an XYZ grid, where the X-axis is the sample number, the Y-axis is the data set, and Z is the transformed value of the data plotted as a color of the color gradient. For example, for embodiments used in semiconductor manufacturing, X is the sample number, Y is the sensor, and Z is the transformed value of the sensor. A color gradient is used to display the Z values on the grid. In one embodiment, the transformed data is associated with the color gradient via a look-up table.

In one embodiment, X is a time-based value. However, X is not limited to this, and X may be a tool/chamber-based value, e.g., where the first set of data is from chamber A, the second from chamber B, etc.

Figure 4:
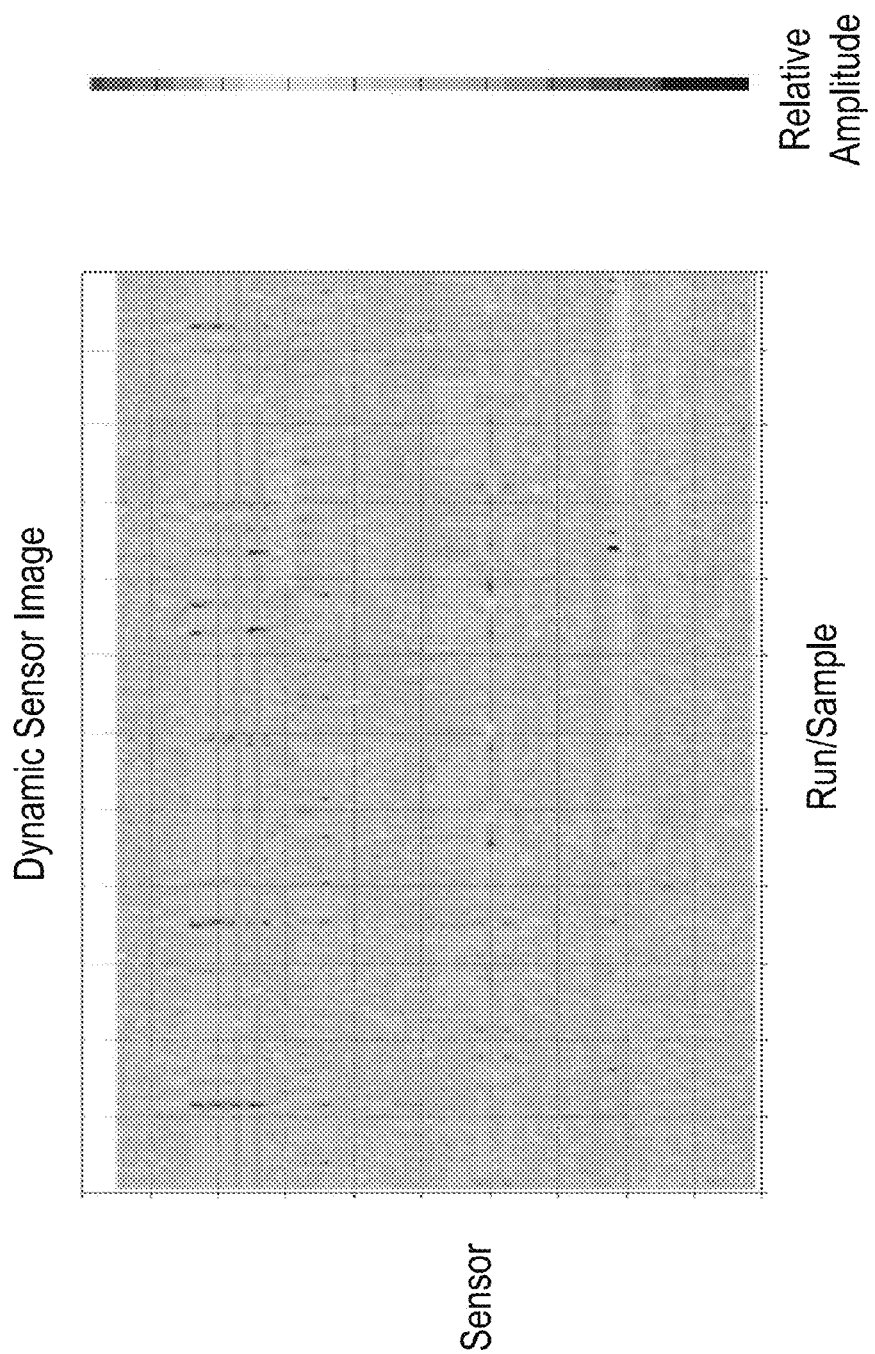
FIG. 4 illustrates an exemplary screenshot of trend DSI in accordance with one embodiment of the invention.

For example, the color gradient may be a −9 to +9 linear color gradient for displaying the Z values on the grid. FIG. 4 illustrates an exemplary screenshot of trend DSI in accordance with another embodiment of the invention, where a −9 to +9 linear color gradient is used for displaying the Z values on the grid.

In block 208, in one embodiment, processing logic receives an optionally user-selected data point of interest. Here, the user may select a data point of interest from the displayed GUI. For example, the user may use a cursor control device (e.g., a mouse) to select a data point of interest (e.g., by right clicking on the data point), such as an anomaly, in the displayed data.

Figure 5:
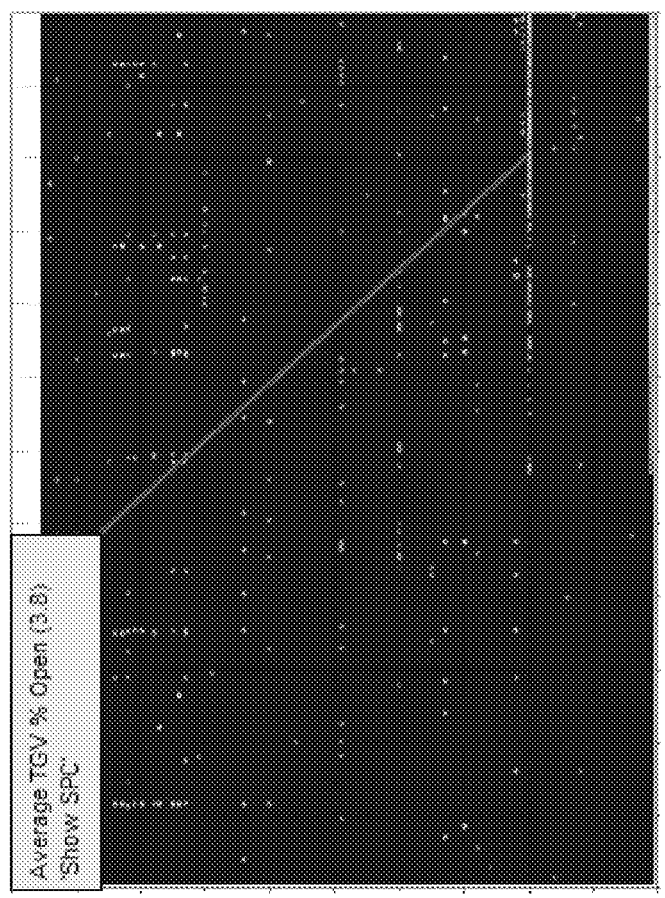
FIG. 5 illustrates an exemplary screenshot of trend DSI in accordance with another embodiment of the invention.

In block 210, in the embodiment where the user may select a data point, processing logic displays additional data associated with the selected data point. For example, a pop-up may be displayed with the data set name, the Z value, and/or a link to an SPC chart for that data set. FIG. 5 illustrates an exemplary screenshot of trend DSI in accordance with an embodiment where a user may select a data point and additional information about the data point may be displayed. In one embodiment, the user is able to exclude a selected data source from the grid.

Figure 3:
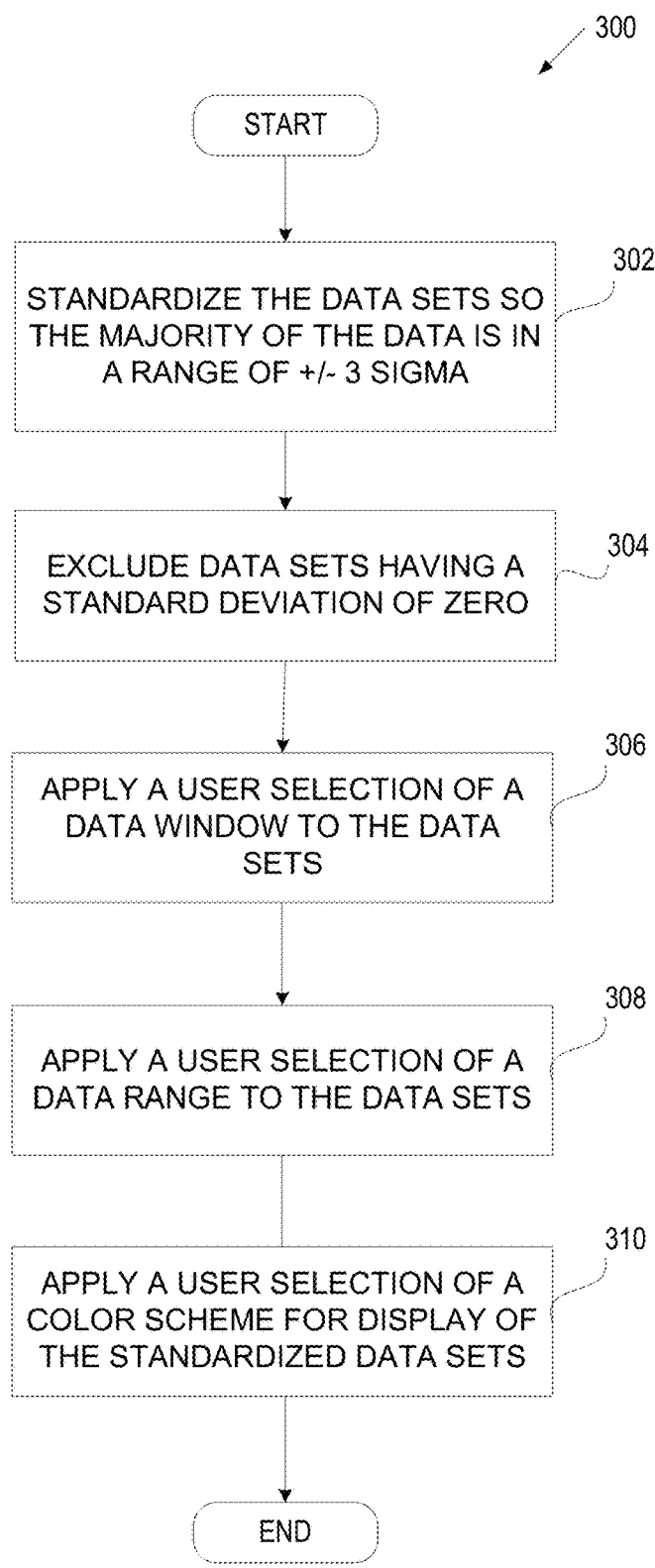
FIG. 3 illustrates another embodiment of a method for trend DSI.

FIG. 3 illustrates a method of pre-processing data for trend DSI according to an embodiment of the present invention. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the network architecture 100 of FIG. 1. In particular, the pre-processing tool 114 of FIG. 1 performs the method 300.

In block 302, according to one embodiment, processing logic of the pre-processing tool 114 standardizes the data set 110. In one embodiment of the transformation of the data, the data is standardized using the following formula:

$$z_i = \frac{x_i - \bar{x}}{\sigma}$$ where $\bar{x}$ is the mean of the sensor and $\sigma$ is the *StdDev* of the sensor After standardization, the majority of the data should fall in the +/−3 sigma range.

A user can select a method by which the mean and standard deviation used for standardizing the data are determined. The user may select to use all of the data retrieved to determine the mean and standard deviation, which may be a default method. The user may instead select to use the first n-samples to determine the mean and standard deviation, which allows the user to see how the data drifts over time. The user may instead select to use summary statistics from a selected time period, such as a day, which allows the users to see how the data drifts compared to a selected time period.

Other types of data transformation can be used to handle different data types and to expose different features. For example, the data may be transformed into a 0-1 range, which is useful for analyzing real time (or raw data) as compared to statistical (or SPC data) where a −9 to +9 range may be more useful.

In block 304, processing logic of the pre-processing tool 114 excludes data sets 110 having a standard deviation of zero, since these data sets 110 are likely not of interest.

In block 306, in one embodiment, processing logic may apply an optionally user-selected data window to the data of the data sets 110. For example, various windows (ex., Hamming or Hanning windows) could be applied to the transformed data to expose different features in the data sets 110.

Figure 6:
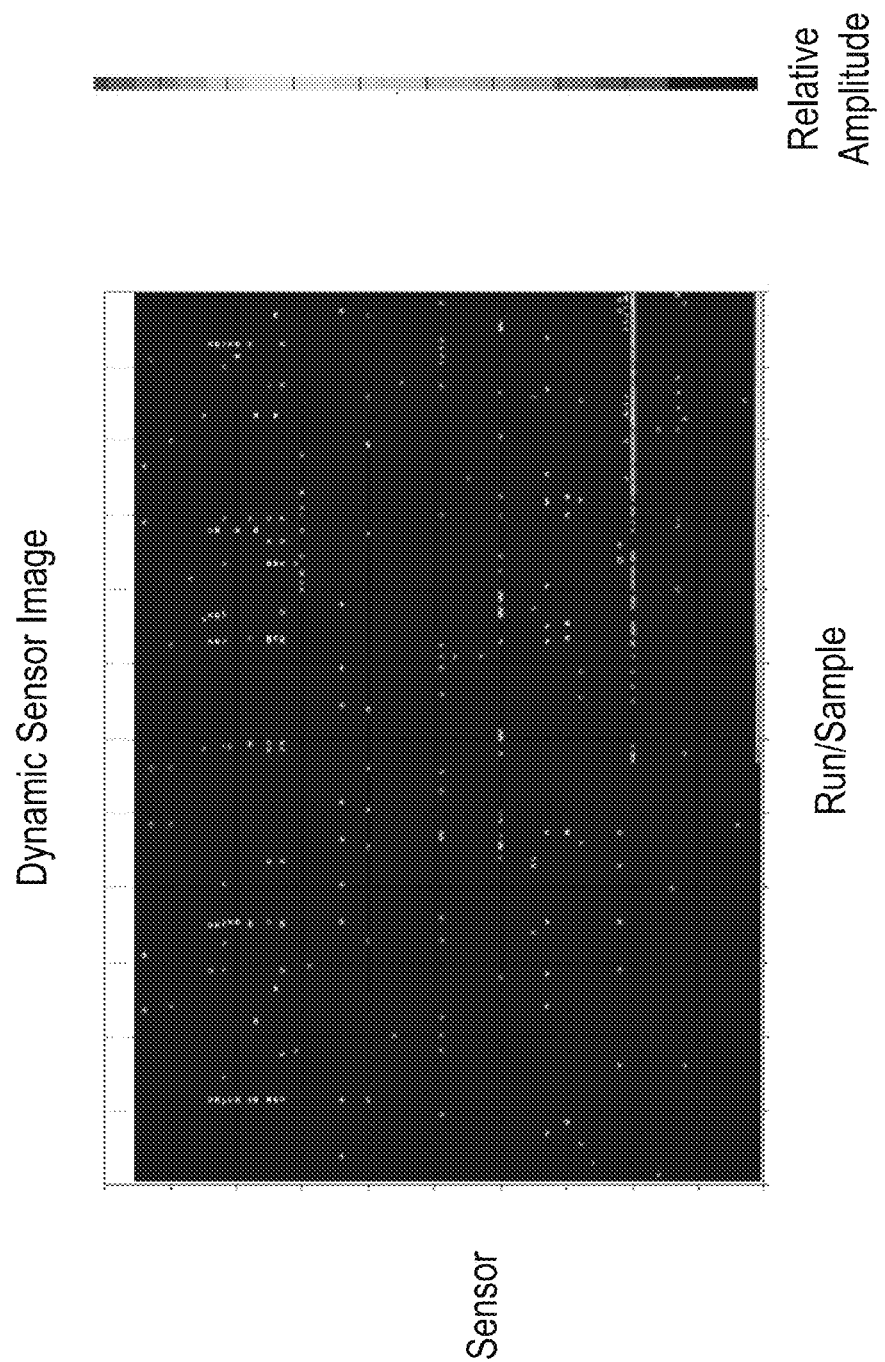
FIG. 6 illustrates an exemplary screenshot of trend DSI in accordance with another embodiment of the invention.

In block 308, in one embodiment, processing logic may apply an optionally user-selected data range to the data sets 110 so that data that is not of interest is not displayed. In one embodiment, only Z values greater than a selected threshold are shown to help visually isolate features of interest. For example, the threshold values may be 0, 3 and 6. In one embodiment, any Z value greater than a positive threshold or less than a negative threshold is plotted as a 0. FIG. 6 illustrates an exemplary screenshot of trend DSI in accordance with an embodiment where there is a threshold of 3.

In block 310, in one embodiment, processing logic may apply an optionally user-selected color scheme for display of the standardized data sets. In one embodiment, different color palettes can be selected to highlight or expose different features of interest. For example, blue to white to red may be particularly effective at showing trend data. In another embodiment, the user may select a desired scale for the color pallets. For example, a linear scale may be a default scale. However, log scaling, polynomial scaling or another user defined scaling may be used to expose different features.

Figure 7:
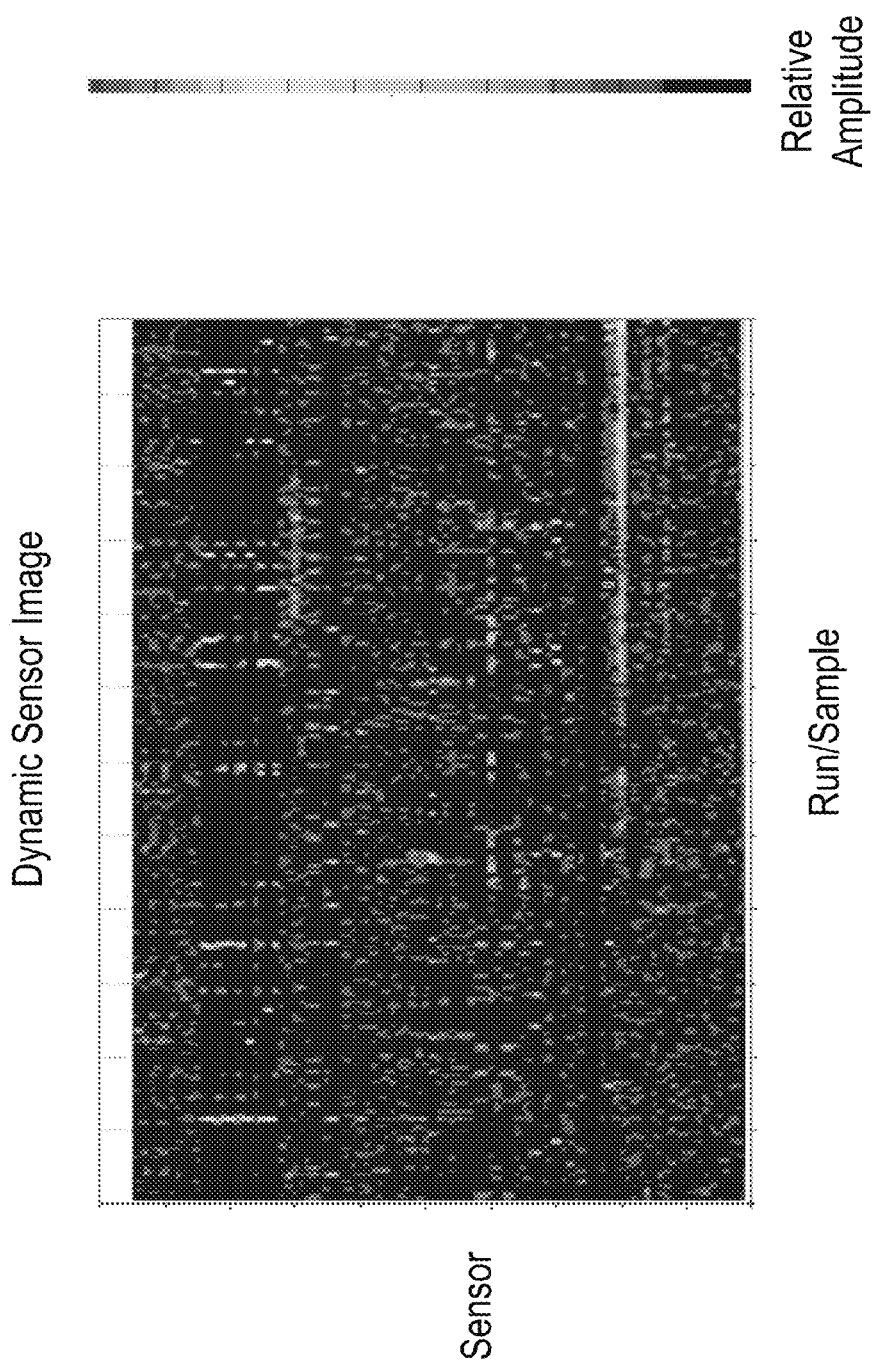
FIG. 7 illustrates an exemplary screenshot of trend DSI in accordance with another embodiment of the invention.

In one embodiment, a direction of a shift or trend of the data is not of interest, and the user is only interested in detecting the magnitude of the shift or trend. Here, absolute Z (the absolute value of Z) is plotted to improve visualization. In this embodiment, the display range is 0 to 9. FIG. 7 illustrates an exemplary screenshot of trend DSI in accordance with an embodiment where absolute Z is plotted. In one embodiment, absolute Z is the default selection.

Figure 8:
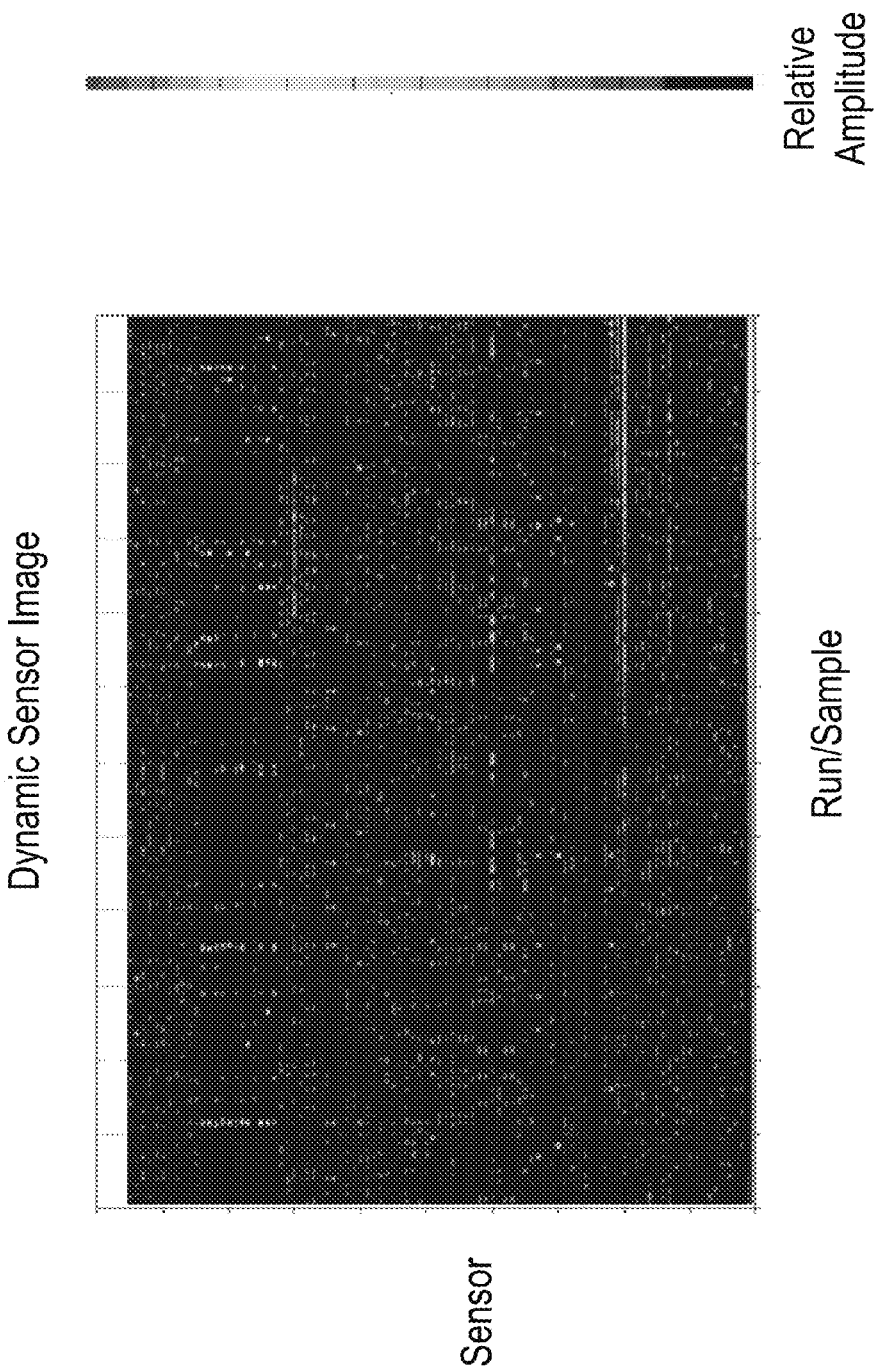
FIG. 8 illustrates an exemplary screenshot of trend DSI in accordance with another embodiment of the invention.

In some instances, interpolation between data sets (e.g., sensors) makes interpreting the data more difficult. Therefore, in one embodiment, a dummy data set with zero values is interleaved between each real data set. FIG. 8 illustrates an exemplary screenshot of trend DSI in accordance with an embodiment where zero values are interleaved between real data sets. In one embodiment, sensor interleaving is not a default selection.

In one embodiment, the user has the ability to zoom into an area of interest on the display. In another embodiment, the user is able to scroll left or right (along the X values) and up or down (along the data sets) to search for an area of interest, including when the user has zoomed into an area of the display. In yet another embodiment, the user can then select a data point (e.g., by right clicking on a point), and additional data about the data point may be displayed.

Figure 9:
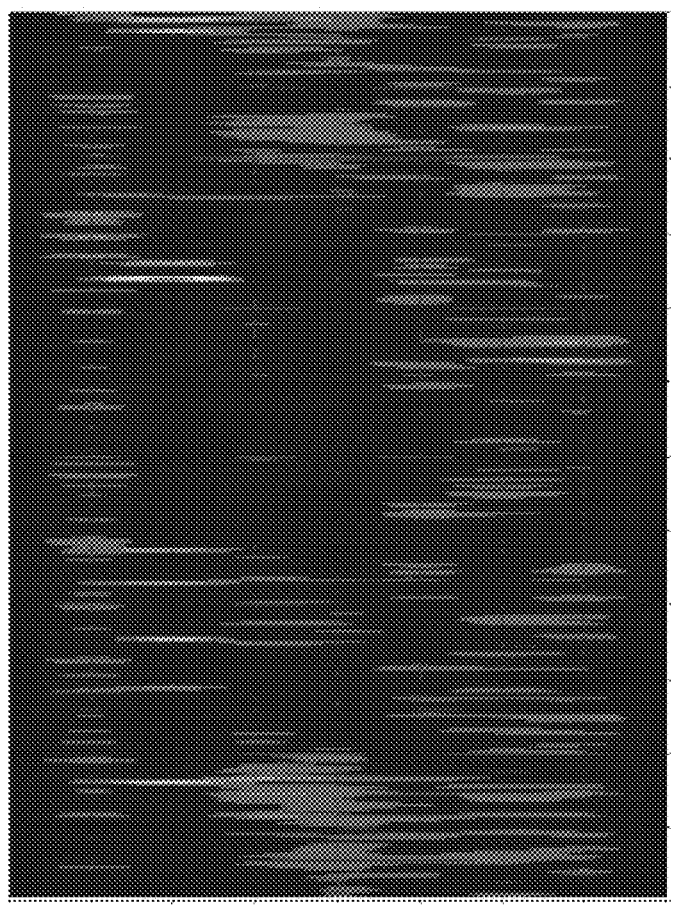
FIG. 9 illustrates an exemplary screenshot of trend DSI in accordance with another embodiment of the invention.

FIG. 9 illustrates an exemplary screenshot of trend DSI where the user selected to use all retrieved data for reference, has zoomed into an area of interest, has selected to plot absolute Z, has not selected to interleave zero values between data sets, and has set a threshold of zero.

Figure 10:
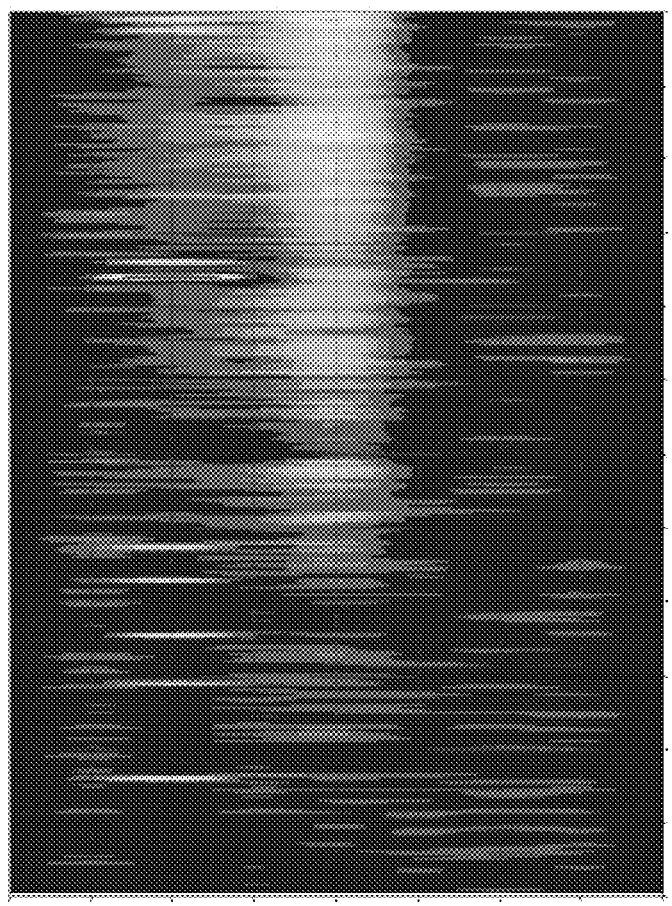
FIG. 10 illustrates an exemplary screenshot of trend DSI in accordance with another embodiment of the invention.

FIG. 10 illustrates an exemplary screenshot of trend DSI where the user selected to use the first 50 runs for reference, has zoomed into an area of interest, has selected to plot absolute Z, has not selected to interleave zero values between data sets, and has set a threshold of zero.

Figure 11:
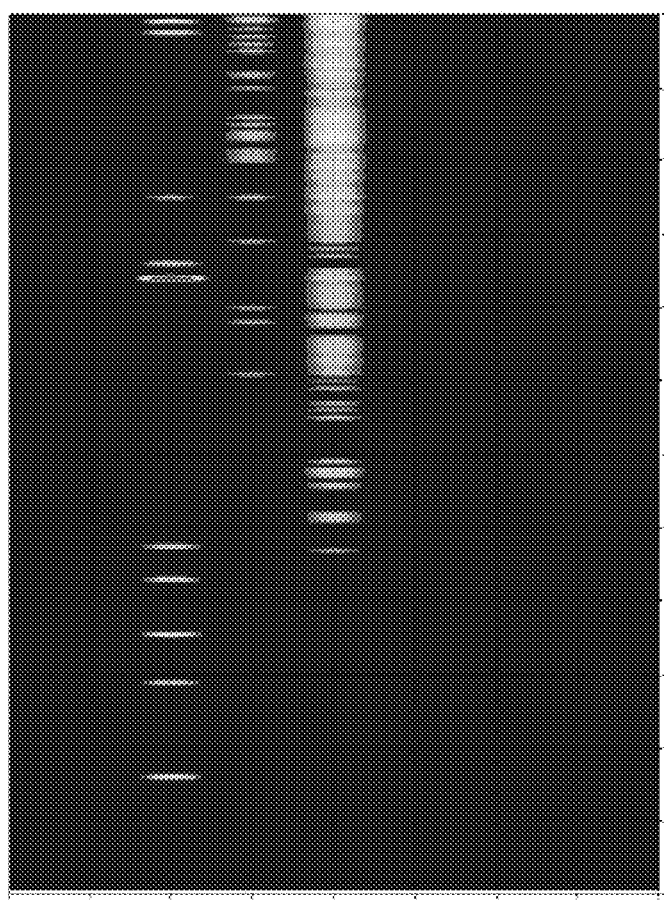
FIG. 11 illustrates an exemplary screenshot of trend DSI in accordance with another embodiment of the invention.

FIG. 11 illustrates an exemplary screenshot of trend DSI where the user selected to use the first 50 runs for reference, has zoomed into an area of interest, has selected to plot absolute Z, has selected to interleave zero values between data sets, and has set a threshold of three.

In another embodiment of the present invention, a user may select to use the median value of the data instead of the mean value of the data in the transformation of the data. For example, if the data set contains multi-modal switches, the mean would average out the modality, whereas median will find the most common mode and reference the data against the most common mode. In this embodiment, the data is standardized using the following formula:

$$z_i = \frac{x_i - \bar{x}}{\sigma}$$ where $\bar{x}$ is the median of the sensor and $\sigma$ is the *StdDev* of the sensor In one embodiment, the default selection should be to use the mean value of the data.

Figure 12:
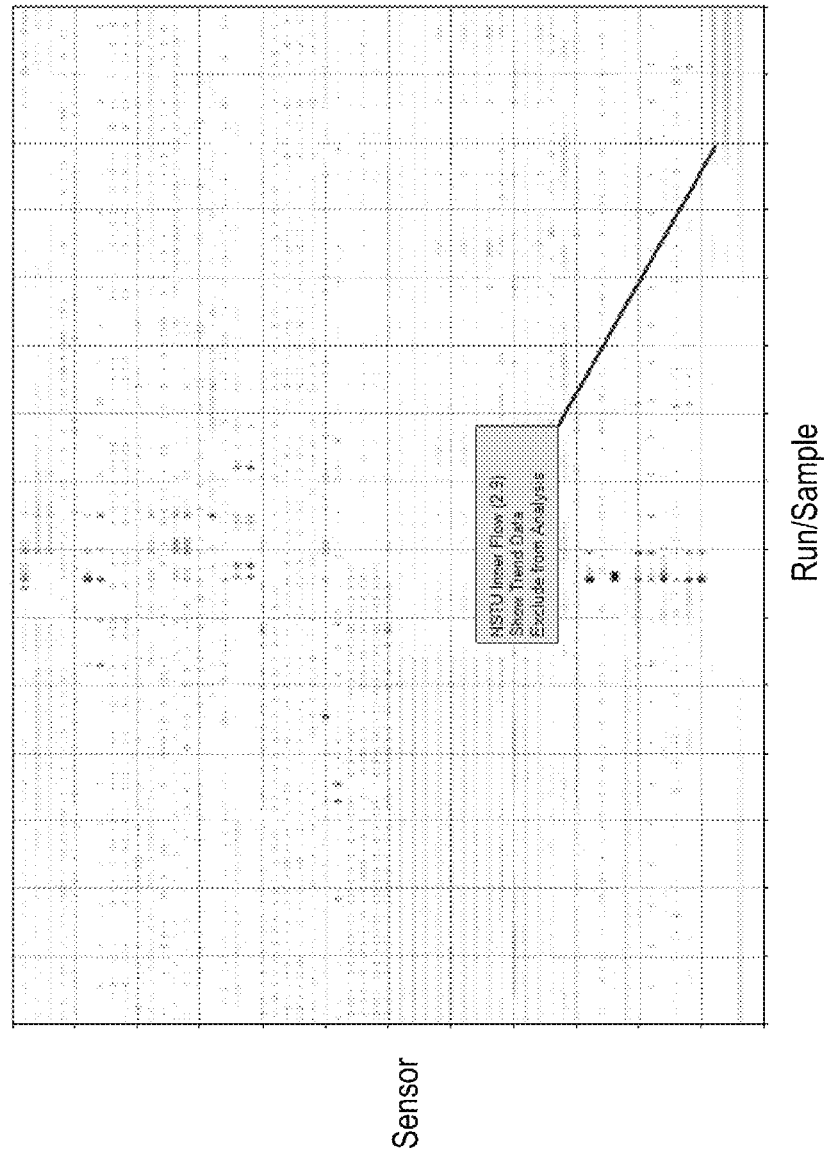
FIG. 12 illustrates an exemplary screenshot of trend DSI in accordance with another embodiment of the invention.

In one embodiment, the default color palette for the values is blue (for low data values) to white to red (high for high data values). This color scheme helps the user visualize the actual changes in the data. FIG. 12 illustrates an exemplary screenshot according to this color palette. In this embodiment, the default may be to not plot Absolute Z.

In one embodiment, at least some of the data source names (e.g., sensor names) are shown on the Y-axis.

In another embodiment, previous similar plots are subtracted from the current plot of interest so that differences between the plots become more apparent.

In an embodiment, different color palettes may be selected depending on the data sets and/or the features to be visualized or extracted. Here, a user would first select the color palette to use (e.g., red to white to blue, blue to red, etc.), and then select the transformation on the color palette.

Below are some examples of transformations on the color palette. In these the same color palette is used, but different transformations show different features. In one embodiment, a user could select multiple transformations depending on the features to be displayed.

Figure 13:
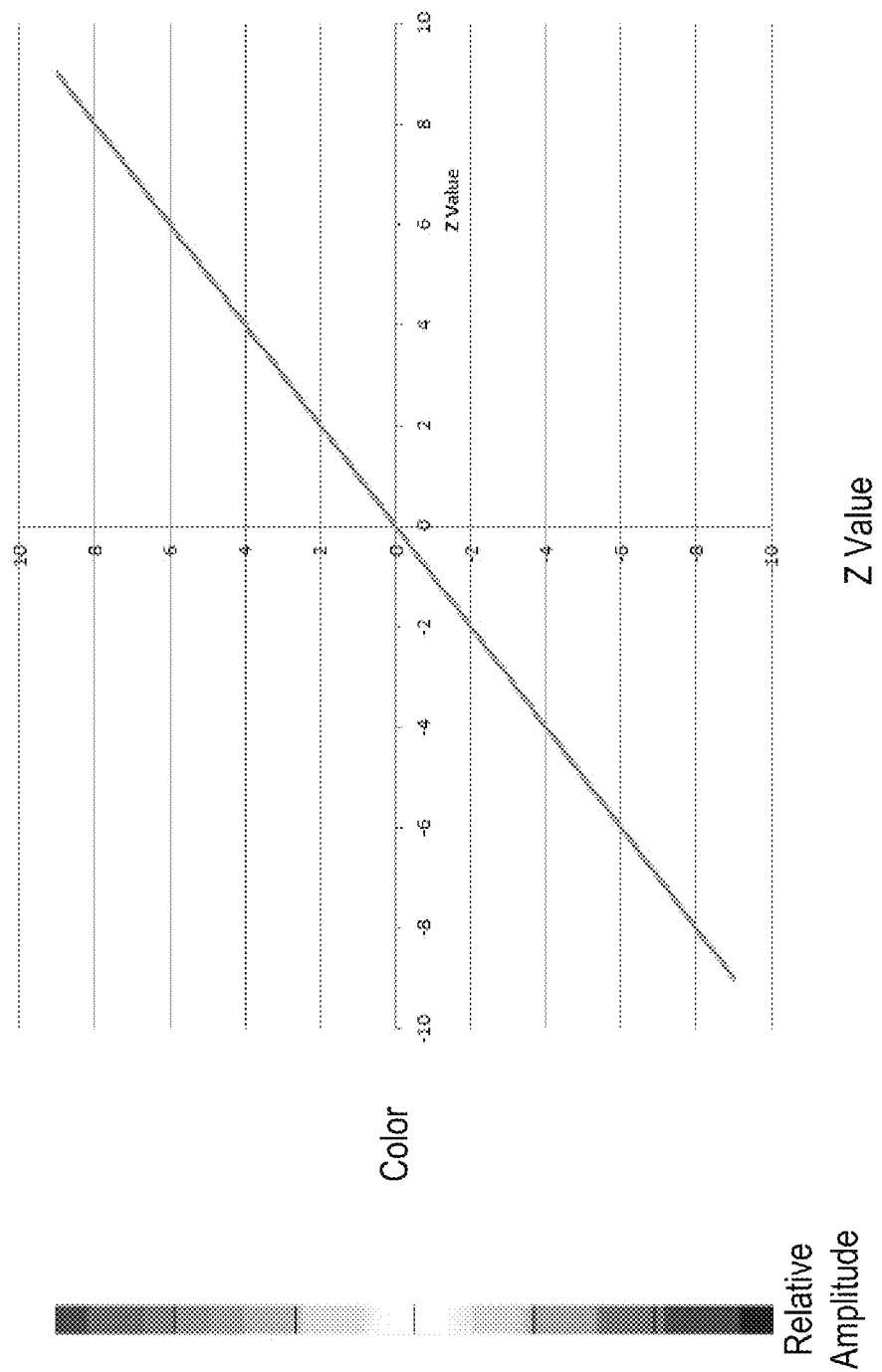
FIG. 13 illustrates an exemplary screenshot of trend DSI in accordance with another embodiment of the invention.

FIG. 13 illustrates an exemplary screenshot of trend DSI where the user selected a color palette transform that is linear and ranges from −9 to 9, which may be a default selection in an embodiment.

Figure 14:
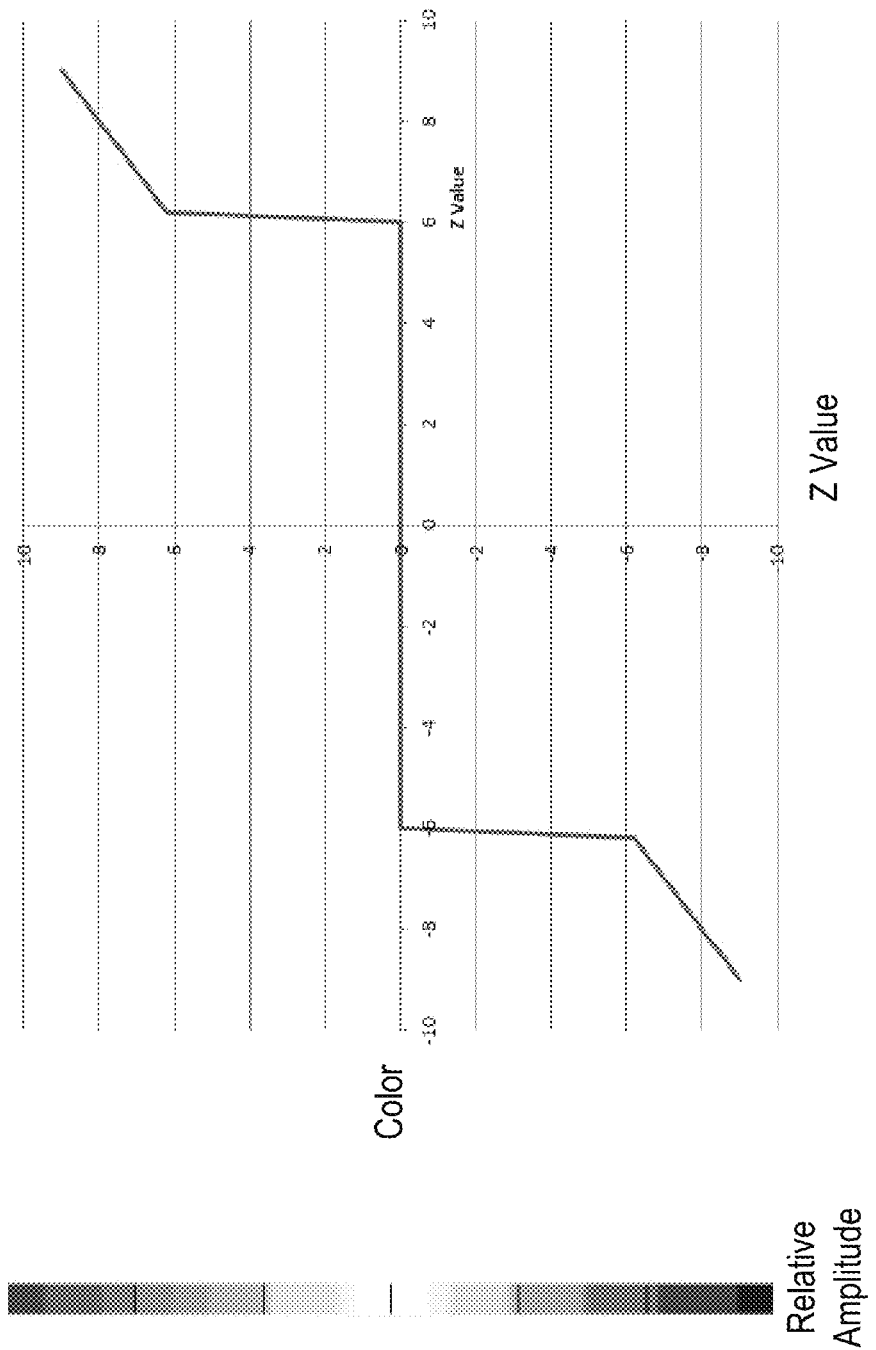
FIG. 14 illustrates an exemplary screenshot of trend DSI in accordance with another embodiment of the invention.

FIG. 14 illustrates an exemplary screenshot of trend DSI showing a transform lookup where the user selected to view only Z-values less than −6 and greater than +6. Here, the following transform could be used:

If abs(z)<6 then z=0 else z=z

Figure 15:
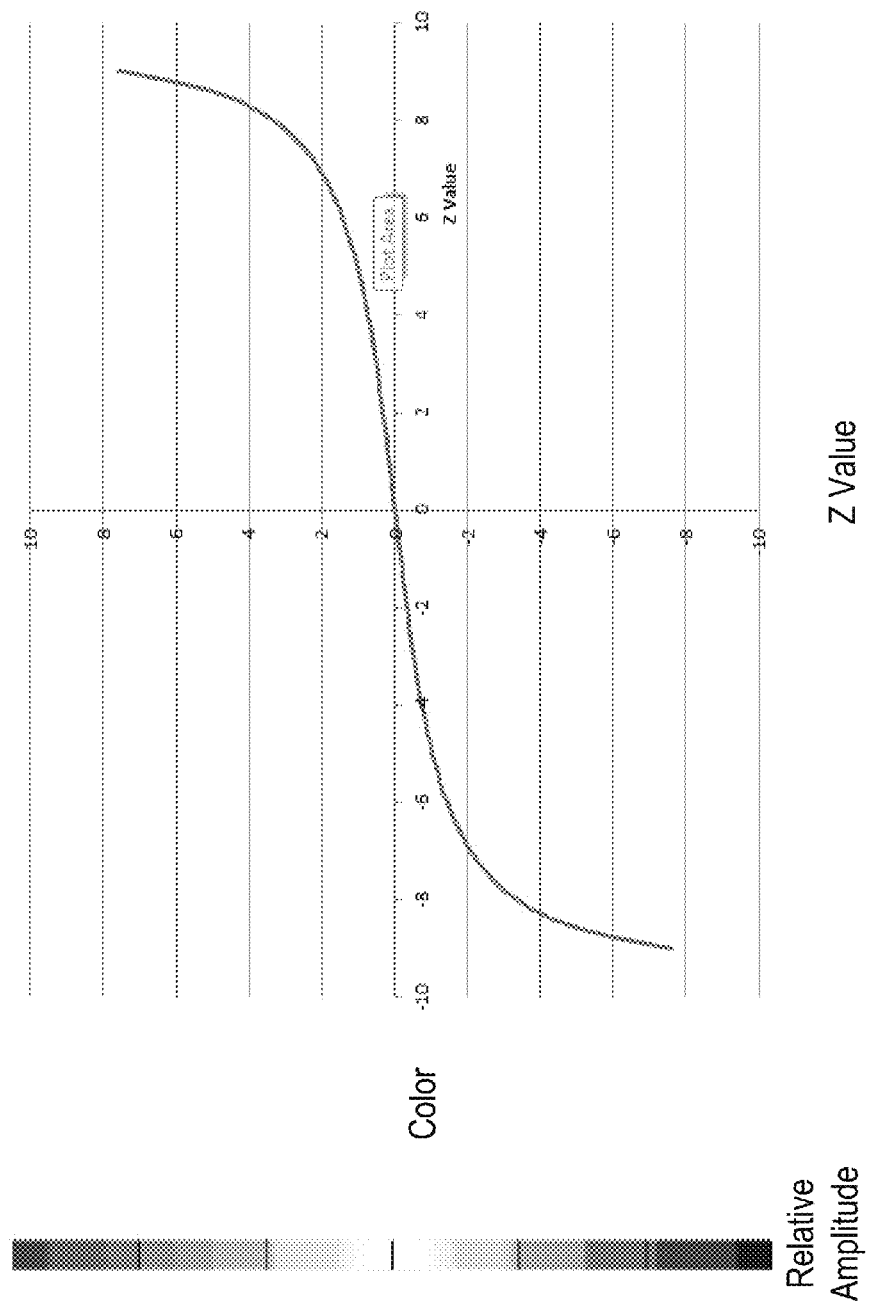
FIG. 15 illustrates an exemplary screenshot of trend DSI in accordance with another embodiment of the invention.

FIG. 15 illustrates an exemplary screenshot of trend DSI showing a transform lookup where the user selected to amplify variations in the extremities of the data. Here, the following tangent based transform could be used:

z←tan(z*0.16)

Figure 16:
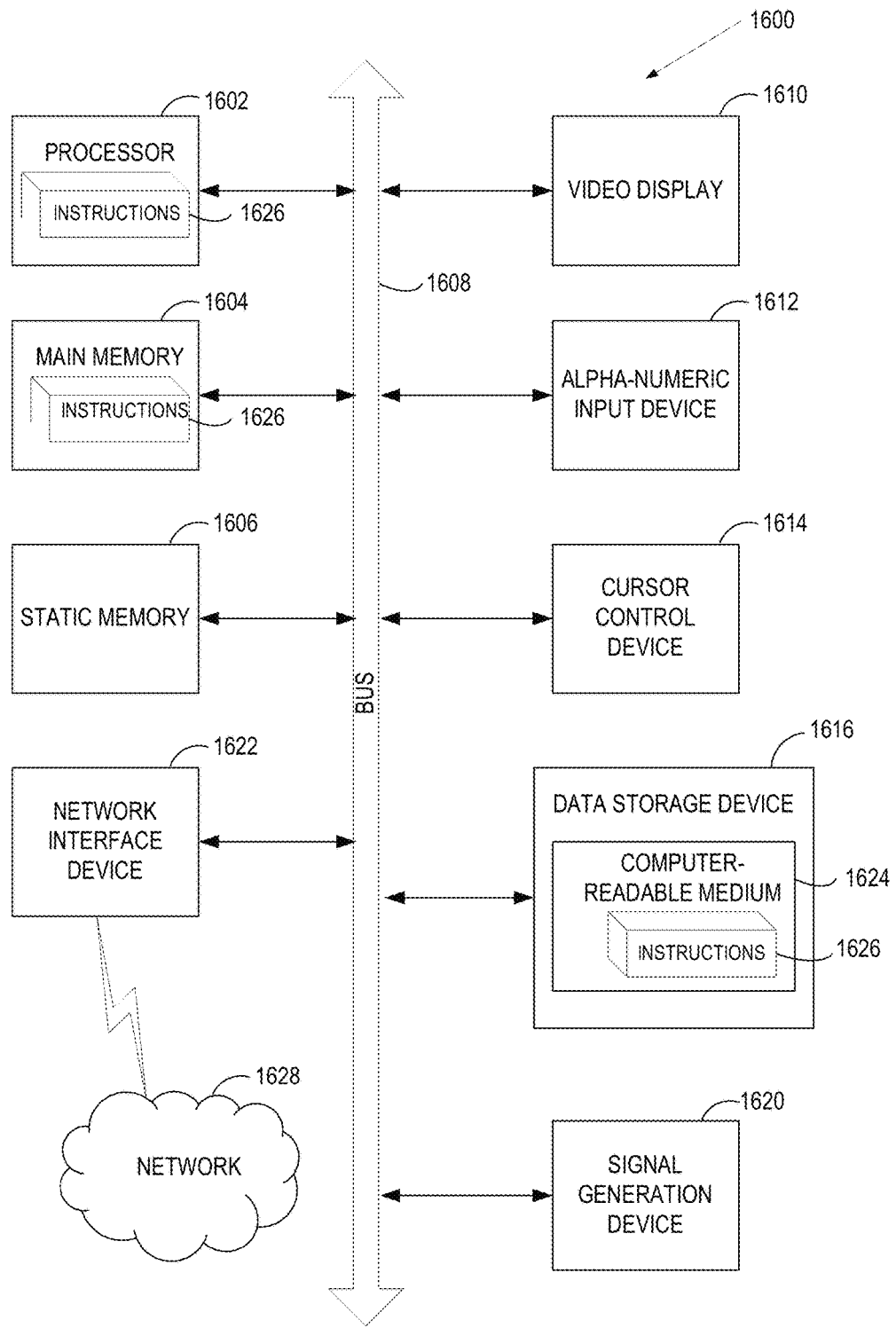
FIG. 16 illustrates an exemplary computer system.

FIG. 16 is a block diagram illustrating an exemplary computing device (or system) 1600. The computing device 1600 includes a set of instructions for causing the computing device 1600 to perform any one or more of the methodologies discussed herein. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

The exemplary computer device 1600 includes a processing system (processing device) 1602, a main memory 1604 (e.g., read-only memory (ROM), flash memory, dynamic random access memory (DRAM) such as synchronous DRAM (SDRAM), etc.), a static memory 1606 (e.g., flash memory, static random access memory (SRAM), etc.), and a data storage device 1616, which communicate with each other via a bus 1608.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1602 is configured to execute the Trend DSI system 102 of FIG. 1 for performing the operations and steps discussed herein.

The computing device 1600 may further include a network interface device 1622. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1620 (e.g., a speaker).

The data storage device 1616 may include a computer-readable storage medium 1624 on which is stored one or more sets of instructions 1626 embodying any one or more of the methodologies or functions described herein. The instructions 1626 may also reside, completely or at least partially, within the main memory 1604 and/or within the processing device 1602 during execution thereof by the computing device 1600, the main memory 1604 and the processing device 1602 also constituting computer-readable media. The instructions 1626 may further be transmitted or received over a network 1628 via the network interface device 1622.

While the computer-readable storage medium 1624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "identifying", "comparing", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an system for performing the operations herein. This system can be specially constructed for the required purposes, or it can comprise a general-purpose computer selectively activated or reconfigured by a computer program stored in the computer. Such a computer program can be stored in a computer (or machine) readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, flash memory, or any type of media suitable for storing electronic instructions.

The algorithms and displays presented herein are not inherently related to any particular computer or other apparatus. Various general-purpose systems can be used with programs in accordance with the teachings herein, or it may prove convenient to construct a more specialized apparatus to perform the method steps. The structure for a variety of these systems will appear from the description herein. In addition, embodiments of the present invention are not described with reference to any particular programming language. It will be appreciated that a variety of programming languages can be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device from a plurality of sensors, a plurality of data sets, wherein each data set of the plurality of data sets corresponds to a respective measurement, by a corresponding sensor of the plurality of sensors, of a corresponding physical process performed by a corresponding manufacturing tool;
   comparing the plurality of data sets to reference data to generate, for each of the plurality of sensors, one or more corresponding comparison values, wherein the reference data corresponds to a user-selected data range;
   transforming, using the one or more corresponding comparison values for each of the plurality of sensors, the plurality of data sets to have a common unitless scale regardless of corresponding physical processes; and
   causing, by the processing device, anomalies in one or more physical processes to be displayed via a client device by plotting the transformed plurality of data sets according to the common unitless scale.

2. The method of claim 1 further comprising causing one or more trends over time in the plurality of data sets received from the plurality of sensors to be displayed via the client device by the plotting of the transformed plurality of data sets according to the common unitless scale.

3. The method of claim 1, wherein the plotting of the transformed plurality of data sets is on a grid according to a color gradient representative of the common unitless scale.

4. The method of claim 3, wherein the plurality of data sets comprises sensor values, a first axis of the grid indicates two or more sample numbers, and a second axis of the grid indicates two or more sensors of the plurality of sensors.

5. The method of claim 1, wherein the one or more corresponding comparison values comprise a corresponding central value and a corresponding average variation from the corresponding central value.

6. The method of claim 1, wherein the one or more corresponding comparison values comprise a corresponding standard deviation and the method further comprises excluding data sets having a standard deviation of zero.

7. The method of claim 1 further comprising, prior to the comparing of the plurality of data sets to reference data, receiving, from the client device, the user-selected data range indicating the reference data.

8. The method of claim 1, at least one of the plurality of data sets corresponds to a different physical process than at least one other data set of the plurality of data sets, wherein a first data set of the plurality of data sets is a first unit of measurement of a first type of physical quality, wherein a second data set of the plurality of data sets is a second unit of measurement of a second type of physical quality that is different from the first type of physical quality.

9. A system comprising:
   a memory; and
   a processing device coupled to the memory to:
      receive, from a plurality of sensors, a plurality of data sets, wherein each data set of the plurality of data sets corresponds to a respective measurement, by a corresponding sensor of the plurality of sensors, of a corresponding physical process performed by a corresponding manufacturing tool;
      compare the plurality of data sets to reference data to generate, for each of the plurality of sensors, one or more corresponding comparison values, wherein the reference data corresponds to a user-selected data range;
      transform, using the one or more corresponding comparison values for each of the plurality of sensors, the plurality of data sets to have a common unitless scale regardless of corresponding physical processes; and
      cause anomalies in one or more physical processes to be displayed via a client device by plotting the transformed plurality of data sets according to the common unitless scale.

10. The system of claim 9, wherein the processing device is further to cause one or more trends over time in the plurality of data sets received from the plurality of sensors to be displayed via the client device by the plotting of the transformed plurality of data sets according to the common unitless scale.

11. The system of claim 9, wherein the plotting of the transformed plurality of data sets is on a grid according to a color gradient representative of the common unitless scale.

12. The system of claim 11, wherein the plurality of data sets comprises sensor values, a first axis of the grid indicates two or more sample numbers, and a second axis of the grid indicates two or more sensors of the plurality of sensors.

13. The system of claim 9, wherein the one or more corresponding comparison values comprise a corresponding central value and a corresponding average variation from the corresponding central value.

14. The system of claim 9, wherein the one or more corresponding comparison values comprise a corresponding standard deviation and the processing device is further to exclude data sets having a standard deviation of zero.

15. The system of claim 9, wherein the processing device is further to, prior to comparing the plurality of data sets to reference data, receive, from the client device, the user-selected data range indicating the reference data.

16. A non-transitory computer readable storage medium comprising instructions that, when executed by a processing device, cause the processing device to perform operations comprising:
   receiving, from a plurality of sensors, a plurality of data sets, wherein each data set of the plurality of data sets corresponds to a respective measurement, by a corresponding sensor of the plurality of sensors, of a corresponding physical process performed by a corresponding manufacturing tool;
   comparing the plurality of data sets to reference data to generate, for each of the plurality of sensors, one or more corresponding comparison values, wherein the reference data corresponds to a user-selected data range;
   transforming, using the one or more corresponding comparison values for each of the plurality of sensors, the plurality of data sets to have a common unitless scale regardless of corresponding physical processes; and causing anomalies in one or more physical processes to be displayed via a client device by plotting the transformed plurality of data sets according to the common unitless scale.

17. The non-transitory computer readable storage medium of claim 16, wherein the operations further comprise causing one or more trends over time in the plurality of data sets received from the plurality of sensors to be displayed via the client device by the plotting of the transformed plurality of data sets according to the common unitless scale.

18. The non-transitory computer readable storage medium of claim 16, wherein the plotting of the transformed plurality of data sets is on a grid according to a color gradient representative of the common unitless scale.

19. The non-transitory computer readable storage medium of claim 18, wherein the plurality of data sets comprises sensor values, a first axis of the grid indicates two or more sample numbers, and a second axis of the grid indicates two or more sensors of the plurality of sensors.

20. The non-transitory computer readable storage medium of claim 16, wherein:
   at least one of the plurality of data sets corresponds to a different physical process than at least one other data set of the plurality of data sets;
   a first data set of the plurality of data sets is a first type of measurement and a second data set of the plurality of data sets is a second type of measurement;
   the first type of measurement and the second type of measurement are selected from temperature, pressure, flow, or power; and
   the first type of measurement is different from the second type of measurement.

* * * * *